United States Patent [19]
Conroy et al.

[11] Patent Number: 5,943,492
[45] Date of Patent: Aug. 24, 1999

[54] APPARATUS AND METHOD FOR GENERATING EXTERNAL INTERFACE SIGNALS IN A MICROPROCESSOR

[75] Inventors: David G. Conroy, El Granada, Calif.; Richard T. Witek, Austin, Tex.

[73] Assignee: Digital Equipment Corporation, Maynard, Mass.

[21] Appl. No.: 08/985,597

[22] Filed: Dec. 5, 1997

[51] Int. Cl.$^6$ .............................. G06F 1/12; G06F 11/263
[52] U.S. Cl. ..................... 395/558; 371/42; 371/27.2; 395/182.16; 395/800.38
[58] Field of Search .................. 395/182.16, 183.22, 395/800.38, 558; 326/41, 39, 105, 38; 371/27.2, 20.02, 20.5, 20.4; 364/717.03, DIG. 1, DIG. 2; 455/17; 370/327

[56] References Cited

U.S. PATENT DOCUMENTS

| | | | |
|---|---|---|---|
| 4,675,862 | 6/1987 | Banzi, Jr. et al. | 371/20.2 |
| 4,698,805 | 10/1987 | Sasuta et al. | 370/327 |
| 4,959,832 | 9/1990 | Bartell, Jr. | 371/27.2 |
| 5,325,501 | 6/1994 | Carlstedt | 364/DIG. 1 |

*Primary Examiner*—Daniel H. Pan
*Attorney, Agent, or Firm*—Gary S. Williams; Pennie & Edmonds LLP

[57] ABSTRACT

An apparatus for generating control signals of a microprocessor includes a memory, for example, a pattern holding register storing an arbitrary bit pattern. The holding register can be loaded by software. A shift register is connected to receive the bit pattern from the pattern register. An output pin of the microprocessor receives each bit of the arbitrary bit pattern, directly, or indirectly via a bus interface unit, at a rate determined by a clock signal to generate control signals for arbitrary external devices.

13 Claims, 3 Drawing Sheets

APPARATUS AND METHOD FOR GENERATING EXTERNAL INTERFACE SIGNALS IN A MICROPROCESSOR

FIELD OF THE INVENTION

This invention relates generally to microprocessors, and more particularly to the control signals generated by microprocessors to operate external peripheral devices.

BACKGROUND OF THE INVENTION

As microprocessors become less expensive and more powerful, the variety of applications where they are found is rapidly increasing. At the low end, microprocessors are now routinely found in home appliances, automobiles, cellular phones, cameras, network interfaces, personal digital assistants (PDAs), and more. At the high end, microprocessors are taking on tasks traditionally claimed by microcomputer systems, such as those based on the Intel 486 class of processors. This presents a problem.

Modern microprocessors, in order to do so many useful things, need to interface with a much larger number of different peripheral devices than those ever contemplated for, say, "simple" PCS. Usually, the specific operations performed by the peripheral devices are managed by control signals carried on bus lines. The signals can be generated by the control signal generator of the microprocessor's bus interface unit.

As one can imagine, there is no single industry standard for control signals. For example, the control signals for an "Intel" interface bears little in resemblance to those required for a "Motorola" interface. Because there is no single industry standard for a microprocessor bus, there is no single standard for control signals. However, in spirit, the buses are quite similar, since there really are only two operations, read and write.

Some devices conform to an ad-hoc standard defined many years ago by Intel for its 8-bit microprocessors. That is, they use asynchronous low-true (RD) and write (WR) strobes. More devices conform to the standard defined by Motorola for its microprocessors. The Motorola "standard" has a direction (RW) signal and a single low-true data strobe.

Control signals for memory devices show similar variations. Read-only, and simple static memories have an interface which is very similar to that used for Intel-style peripheral devices. However, dynamic memories typically have very different interfaces, and require a very different set of control signals. To make matters even worse, there are a number of variations on dynamic memory interfaces, e.g., normal DRAMs, extended-data-out DRAMs, bursting extended-data-out DRAMs, and so forth. Each protocol is different in some level of detail.

In the prior art, the usual way of dealing with this problem is as follows. First, the designer of the microprocessor develops a list of all the external devices that should be supported. Second, the designer develops a specification of how the control signals for the selected devices should work.

Now, the designer can build a complex ad-hoc controller that generates all of these control signals. In order to provide overall control, the designer also needs to come up with some kind of software loadable mode register. Last, the package needs to be equipped with dedicated external pins to carry the various control signals off the microprocessor chip. Having dedicated instead of general purpose pins is a less-than-satisfactory.

It is difficult to develop a specification for how the control signals should function. The interface standards for the external devices, such as memories and peripherals, are usually not formal standards. The requirements for these signals must be derived from a large number of data sheets of representative devices to determining the appropriate intersection/union of the representative specifications, and striking an appropriate compromise.

This is tedious and error-prone work. The work must be done very accurately because once the design is complete, the designer casts his or her logic into hard silicon where changes are difficult to make. Devices accidentally forgotten or erroneously specified could not be used. Also, if the actual devices operate slightly different than specified, adjusting the control signals accordingly is difficult. Even minor timing variations between like devices from different manufacturers may present a problem.

Even if the design was perfect, it would soon be out-of-date. New devices operating to different specifications would have to wait for the next redesign on the chip. The root cause of both of these problems is the same; present control signal generators include too many specific details of the supported devices and therefore require dedicated pins.

Therefore, it is desired to provide means which can be incorporated into a microprocessor for generation any number of arbitrary control signals that can operate a variety of external devices on general purpose external pins.

SUMMARY OF THE INVENTION

The invention provides a way to generate signals needed for external peripheral devices that is much simpler and more versatile than what is known. The invention does this by replacing the usual collection of ad-hoc control signal generation logic with a set of general purpose pattern generators connected to general purpose external pins.

The pattern generator based scheme is simpler because it replaces complex ad-hoc logic with a very regular logic structure, and because it completely eliminates the most difficult part of the design of the ad-hoc logic, which is verifying that the specification of the logic is, in fact, appropriate for controlling the external devices. The pattern generator based scheme is more versatile because it can generate the control signals needed by any external device, not just those devices which were considered when the ad-hoc logic was specified.

In one embodiment, an apparatus for generating control signals of a microprocessor includes a pattern holding register for storing an arbitrary bit pattern. A shift register is connected to receive the arbitrary bit pattern from the pattern register. An output pin of the microprocessor receives each bit of the arbitrary bit pattern from the shift register at a rate determined by a clock signal to generate control signals for arbitrary external devices. The pattern register, of which there can be more than one for each shift register, is loadable by software. As an advantage, this identical design can be replicated for any class of device needing control signals.

DETAILED DESCRIPTION OF THE PREFERRED EMBODIMENT

Figure 1:
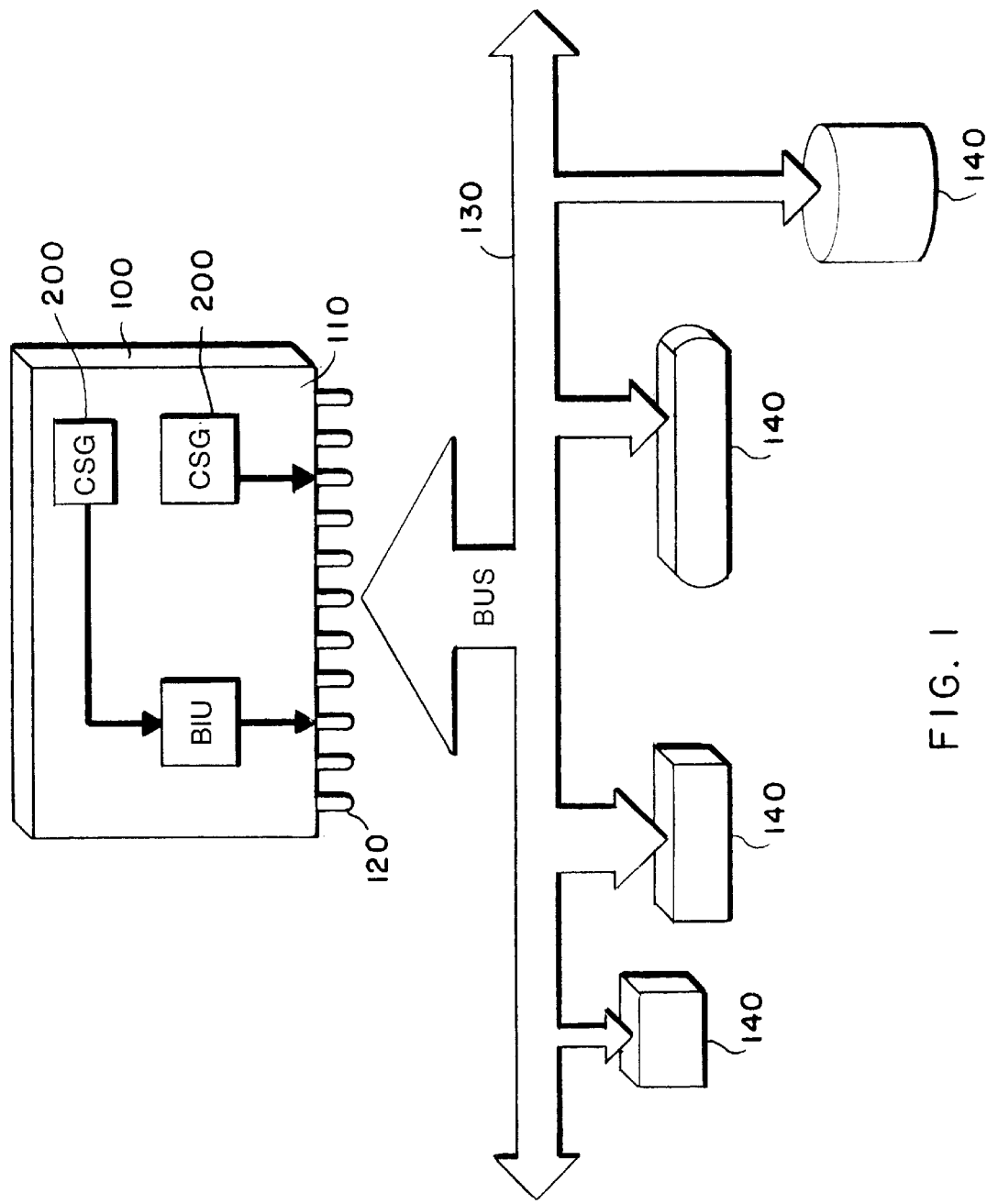
FIG. 1 is a block diagram of a microprocessor including a control signal generator according to the invention.

FIG. 1 shows a microprocessor 100 including one or more control signal generator (CSG) 200 according to the invention. There is one CSG for each external pin 120. In one configuration, the output of the generator 200, with appropriate buffering, can directly be connected to one of the external pins 120, since no further interpretation is required. Alternatively, the output is can be connected to one of the pins 120 via a bus interface unit (BIU) 110.

Typically, the pins 120 are connected to bus lines 130. The bus lines can carry timing, address, data, and control signals. These signals are used to operate the various devices 140, for example, memories, peripheral devices, disks, and so forth.

Figure 2:
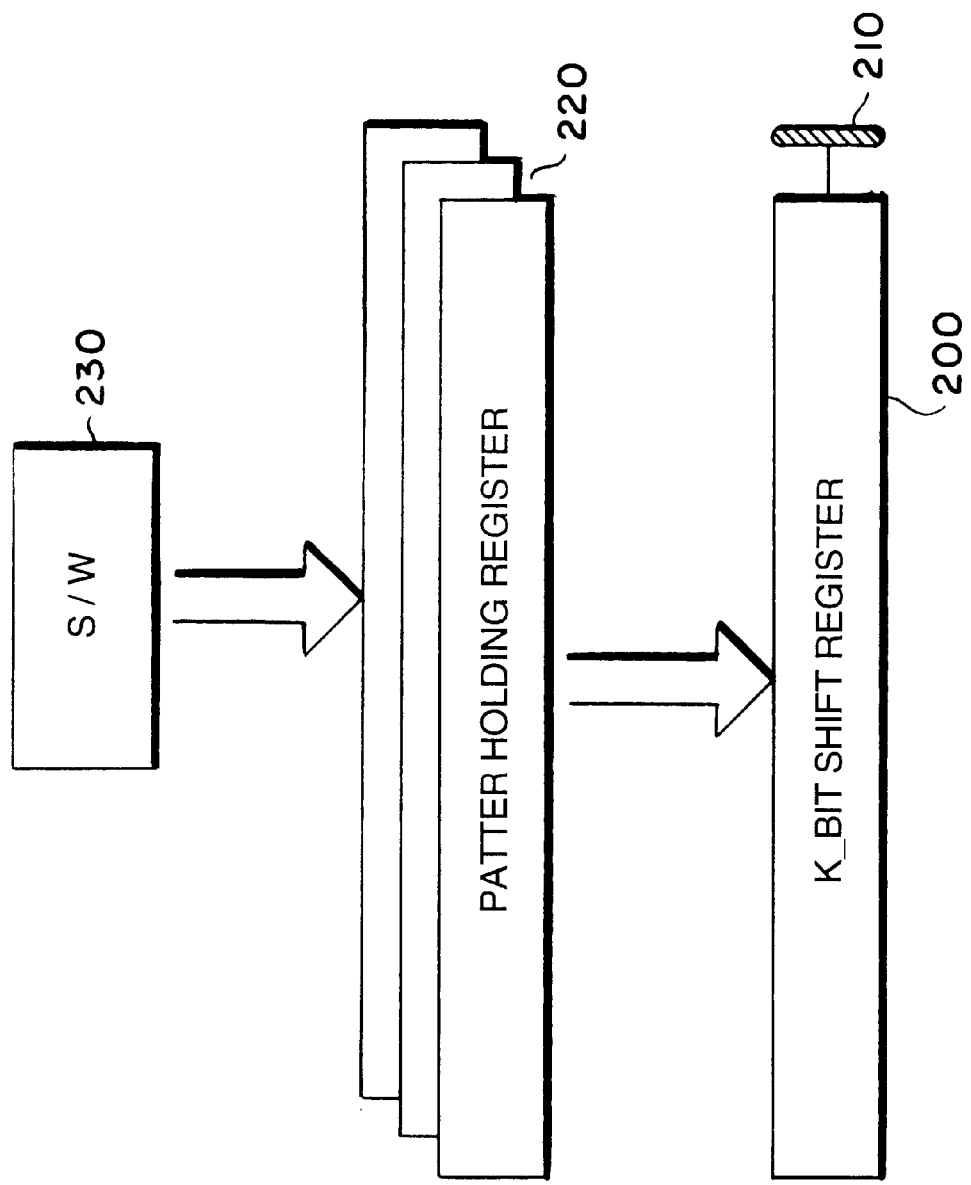
FIG. 2 is a block diagram of a pattern holding register connected to a shift register connected to an output pin of the microprocessor.

As shown in FIG. 2, here, of particular interest is a general purpose pin 210 that carries a control signal. The number of pins 210 needed for control signals is determined by the device 140 with the largest number of control signals.

Each pin 210 is connected directly (or indirectly via the BIU) to the output of a k-bit shift register 200. The shift register 200 is connected to receive input from one or more pattern holding registers 220. Alternatively, patterns can be stored in a randomly accessible memory (RAM). The registers or RAM 220 are loadable by software 230, e.g., instructions executed by the microprocessor 100.

The smallest number of pattern holding registers which would work is one per shift register. In this case, all of the devices would need to follow the same protocol, or software would need to save, reload, and restore pattern holding registers on an external cycle by cycle basis.

A more practical scheme would associate pairs of pattern holding registers with regions of the microprocessor's address space, and the two registers in the pair would be used for reads and writes respectively; such a scheme would make the configuration much more static.

Of course, the microprocessor needs to know where during an external event data should actually be sampled on reads, or driven, on writes. The best way to solve this problem is to use additional holding register and shift register pairs, and use these to generate patterns which are used internally by the bus interface unit to control the sampling and/or driving of data.

Figure 3:
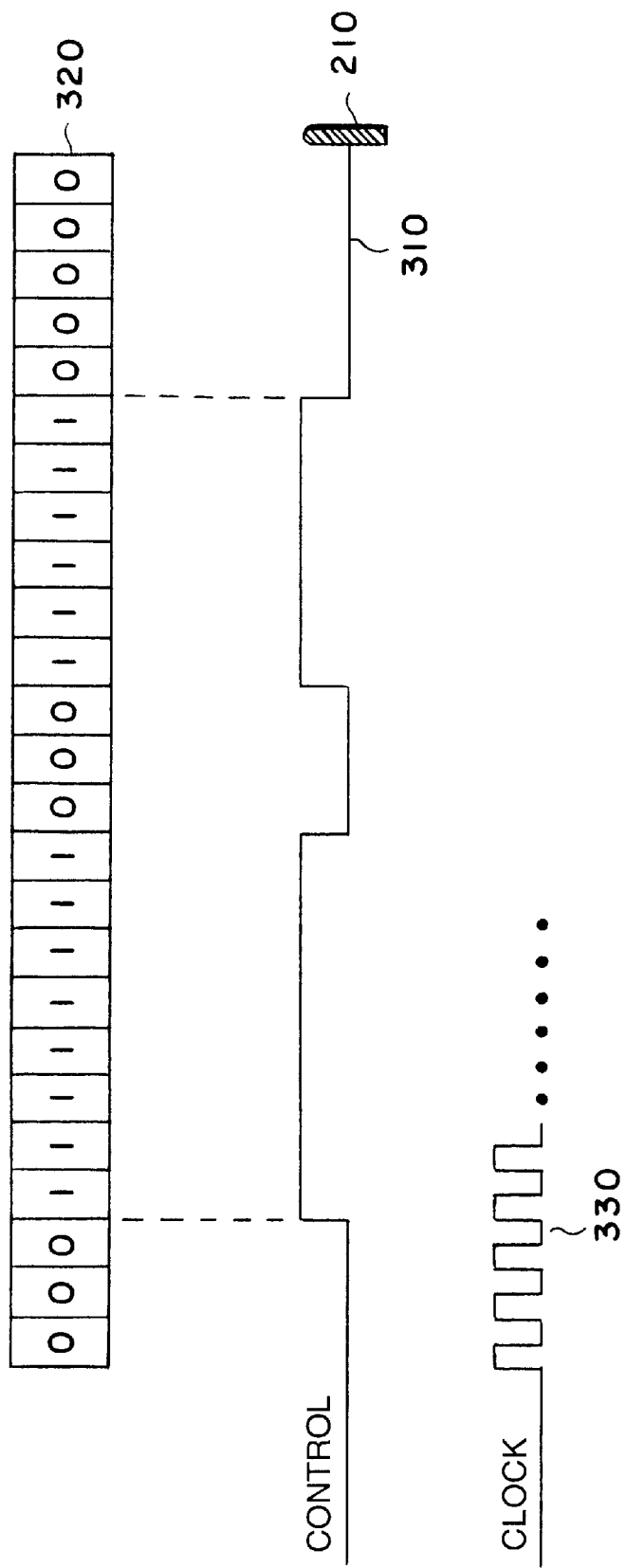
FIG. 3 shows a sample bit pattern and corresponding control signal.

As shown in FIG. 3, whenever the microprocessor 100 needs to generate some arbitrary control signal 310 on pin 210, a corresponding bit pattern 320 is stored in one of the pattern holding registers 200. The bit pattern 320 is transferred to the shift register 200. The bit pattern is then shifted out to the pin 210 at a rate determined by a clock signal 330. The speed at which the shift register 200 needs to be clocked, and the number of bits in the register 120 are determined by the set of devices included in the system 100, for example, the shift register 200 is clocked by timing signals at the slowest speed which still has a fine enough timing grain, for example, 200 MHZ. The shift register needs to be long enough to generate the full external control signal. Clocking the shift register quickly and making k large is never wrong from a correctness point of view, although it might be undesirable because space on the microprocessor is wasted.

The pin 210 can be connected via the bus lines 130 to any of the devices 140 for which the control signal is appropriate. Here, the control signal generator does not need to know anything about the "protocol" of the signal 310. This is determined by the software 230. Therefore, as an advantage, the software can easily be changed to generate any type of control signal. In addition, by generating the control signals with a shift register, small changes in timing to account for fanout buffers that may be in the path of a signal, can easily be accommodated, that is, the "shape" of the signal 210 can dynamically be adjusted by the software as the system is operating. This is not possible with known generators.

It is understood that the above-described embodiments are simply illustrative of the principles of the invention. Various other modifications and changes may be made by those skilled in the art which will embody the principles of the invention and fall within the spirit and scope thereof.

We claim:

1. An apparatus for generating control signals of a microprocessor, comprising:

a memory storing an arbitrary bit pattern representing a control signal suitable for controlling a device external to the microprocessor;

a shift register connected to the memory, the shift register to receive the arbitrary bit pattern; and an output pin of the microprocessor connected to the shift register for transmitting each bit of the arbitrary bit pattern at a rate determined by a clock signal.

2. The apparatus of claim 1 wherein the memory is a pattern holding register.

3. The apparatus of claim 1 wherein the memory is randomly accessible.

4. The apparatus of claim 1 further including a bus interface unit receiving each bit of the arbitrary bit pattern.

5. The apparatus of claim 1 wherein the shift register is connected to a plurality of pattern holding registers, each pattern holding register for storing a different arbitrary bit pattern to load into the shift register.

6. The apparatus of claim 1 wherein the pattern holding register is loaded by software.

7. The apparatus of claim 1 wherein the microprocessor includes a plurality of output pins, and each output pin is connected to a corresponding shift register, the shift register in turn connected to one or more corresponding holding registers.

8. The apparatus of claim 7 wherein the plurality of output pins are connected to a plurality of external devices.

9. The apparatus of claim 7 wherein the number of pins is determined by a particular one of the plurality of devices having a largest number of control signals.

10. The apparatus of claim 1 wherein the rate of shifting the shift register bits to the output pin at a slowest rate that provides fine granularity on the control signal to correctly operate the device.

11. The apparatus of claim 1 wherein the bit pattern is varied dynamically during its operation.

12. The apparatus of claim 1 including a pair of holding registers, a first holding register storing a read bit pattern and second holding register storing a write bit pattern writing.

13. A method for generating control signals of a microprocessor, comprising steps of:

storing in a memory an arbitrary bit pattern representing a control signal suitable for controlling a device external to the microprocessor;

loading the arbitrary bit pattern into a shift register from the memory;

shifting each bit of the arbitrary bit pattern from the shift register to an output pin of the microprocessor at a rate determined by a clock signal; and transmitting the bit pattern from the output pin to the device external to the microprocessor.

\* \* \* \* \*